(12) United States Patent
Honda

(10) Patent No.: US 6,778,254 B2
(45) Date of Patent: Aug. 17, 2004

(54) MOTION PICTURE CODE EVALUATOR AND RELATED SYSTEMS

(75) Inventor: Yoshizou Honda, Kanagawa (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 10/366,156

(22) Filed: Feb. 13, 2003

(65) Prior Publication Data

US 2003/0184713 A1 Oct. 2, 2003

(30) Foreign Application Priority Data

Feb. 18, 2002 (JP) .................................. P. 2002-039545

(51) Int. Cl.$^7$ .................. G03B 21/50; G06F 11/00
(52) U.S. Cl. .............................. 352/92; 714/746
(58) Field of Search ..................... 352/92; 375/240.29, 375/240.26; 396/210, 310, 315; 714/746

(56) References Cited

U.S. PATENT DOCUMENTS 6,490,705 B1 * 12/2002 Boyce ......................... 714/776
6,530,055 B1 *  3/2003 Fukunaga .................... 714/746
6,556,273 B1 *  4/2003 Wheeler et al. ............... 352/92
2002/0097803 A1   7/2002 Honda
2002/0126258 A1   9/2002 Honda

* cited by examiner

Primary Examiner—Russell Adams
Assistant Examiner—Arthur A Smith
(74) Attorney, Agent, or Firm—Fish & Richardson P.C.

(57) ABSTRACT

A motion picture code evaluator evaluates a transmitted motion picture based on losses caused by a transmission means. The evaluator includes means for testing the frame header of the motion picture code and determining the presence/absence of an error in the frame header to calculate the frame loss ratio per predetermined time. The evaluator further includes means for extracting a motion picture coding parameter contained in the frame header and detecting a variation in the motion picture coding parameter in the predetermined time, and means for summing the motion picture coding parameter and the motion picture coding parameter weighted by the variation in a motion picture coding parameter in the predetermined time to calculate an ideal motion picture information amount in a predetermined time. The motion picture code evaluator thereby obtains an actual motion picture information amount by multiplying the ideal motion picture information amount by 1-frame loss ratio.

10 Claims, 2 Drawing Sheets

MOTION PICTURE CODE EVALUATOR AND RELATED SYSTEMS

DETAILED DESCRIPTION OF THE INVENTION

1. Technical Field to which the Invention Belongs

The present invention relates to a motion picture code evaluator and in particular to a motion picture code communications evaluation technology to evaluate the code and the protocol used in transmission/reception of digital motion picture data.

2. Prior Art

A digital motion picture is a continuous sequence of instantaneous pictures in time called motion picture frames (hereinafter referred to as frames).

Data of a digital motion picture is generally huge. Thus, motion picture code transmission is generally performed where compression or encoding of information is made for data communications, followed by a decoding process to regenerate a motion picture.

Standards for motion picture codes includes, for example, MPEG (Moving Picture Experts Group)-2 (ISO/IEC13818) and MPEG-4 (ISO/IEC14496) specified by ISO/IEC (International Organization for Standardization/International Electrotechnical Commission), and H.261 and H.263 specified by ITU (International Telecommunication Union) recommendations.

The present invention is applicable to similar motion picture codes as well as the international standards.

In the aforementioned motion picture code, frames comprise pixels arranged in a shape of a grating. A frame has a format such as the CIF format comprising 352 pixels in the horizontal direction and 288 pixels in the vertical direction and the QCIF format 176 pixels in the horizontal direction and 144 pixels in the vertical direction.

The number of pixels which constitute a frame is also called a screen size.

In the case of a color image, the number of pixels available in the CIF format are a luminance screen (Y) and a color difference screen (U, V). A 4:2:0 format which assigns one pixel to U information on the color difference screen and one pixel to V information on the color difference screen per two by two pixels on the luminance screen, and a 4:2:2 format which assigns one pixel to U information on the color difference screen and one pixel to V information on the color difference screen per two pixels on the luminance screen are available.

The number of pixels on the color difference screen in the 4:2:2 format is double that in the 4:2:0 format.

The primary colors, RGB (red, green, blue), may be used to represent respective number of pixels.

The number of pixels indicates luminance and color difference or all pixels of the primary colors.

It goes without saying that the more the number of pixels per frame is, the higher-resolution or higher-quality picture is obtained.

The number of frames per unit time may be 30 frames per second or 15 frames per second. The greater this figure is, the smoother motion is represented, that is, the higher-quality picture is obtained.

In digital representation of luminance, intermediate halftones from the darkest black to the lightest white are quantized.

In such a case, the quantization level represented by a digital value is finite. In general applications, levels in the neighborhood of 256-level gray scale which can be visually represented in eight bits are used.

The number of colors is infinite when colors are digitally represented. Colors around 16 million colors are used.

Such colors may be the number if levels of gray scale quantization.

The number of quantization levels is the number of colors unless otherwise specified.

In this case also, the more the number of gray-scale levels is, the higher-quality picture is obtained.

The total number of quantization levels gathered for the pixels in all the frames within a specific time is called motion picture information amount.

In general, the number of pixels of a frame and the number of frames per second are constant, although there are cases where the number of pixels or frames varies.

The number of quantization levels may vary within a frame.

In terms of a load on a transmission path, transmitter or receiver, the smaller the amount of motion picture codes is, the smaller the load is.

Thus, a higher amount of motion picture codes for the information amount of a picture before compression of information, that is, a higher compression rate or coding is desirable.

In a motion picture code according to the international standards or equivalent, the actual coding efficiency is limited. To reduce a load on a transmission path, transmitter or receiver, it is practically efficient to reduce the number of pixels, frames, and quantization levels. This degrades the picture quality.

Actual operation in transmission of motion pictures is costly. Thus, a service method is available which charges by the amount of information in motion pictures, in order to compensate for a load on a transmission path, transmitter or receiver.

Quality degradation of a motion picture in the course of transmission of a motion picture code will be described.

In communications of a motion picture code, the receiving party obtains a lower quality picture than the original for the following reasons:

A transmission error may prevent a motion picture code from being properly received.

Some packets may be lost halfway as a result of data transmission in packets.

Communications of motion picture codes may take excessive time. An encoded motion picture frame may not be ready for display at the timing of the display in the ongoing motion picture playback. In this case, display of the motion picture frame is skipped to shift to the processing of the next motion picture frame.

In this way, a section which failed to display an encoded picture of the original motion picture is called a loss of motion picture.

A transmission error has different affects on the decoded motion picture to be displayed, depending on the section where the error has taken place.

A section which accommodates parameters to represent the specifications for the entire motion picture codes such as the screen size of a motion picture code and a color difference format as well as codes used in the predictive coding system and prediction method for the entire frame is called a header.

In case a transmission error has occurred in the header section, display of the entire decoded motion picture may be disabled or display of the entire decoded frame may be disabled.

In case a transmission error has occurred in a section concerning the gray-scale level of pixels in a frame, display of the decoded pixel may be disabled.

In this way, the amount of motion picture codes not used for display of decoded pictures due to a transmission error and a delay and the amount of loss of a decoded motion picture are not in a fixed relationship. Thus, a loss of the motion picture must be evaluated on demand.

The example of reference by the same inventor, US-2002-0097803-A1 "Method for evaluating dynamic image code communications, and apparatus for evaluating the same" provides apparatus to evaluate the motion picture information amount and motion picture loss amount.

A configuration example thereof will be described using FIG. 2.

A motion picture code transmitter 11 transmits a motion picture code, which is received and recoded by a motion picture code receiver 22.

The amount of motion picture codes is counted on a motion picture code counter 27.

A motion picture loss evaluator 33 evaluates a motion picture loss amount as described below.

A motion picture quality evaluation value converter 38 subtracts the motion picture loss amount from the motion picture information amount.

The principle configuration and operation of the aforementioned motion picture loss evaluator 33, which is described in the Japanese Patent Application No. 153078/1999 "Motion picture communications quality determination apparatus" will be outlined below.

The motion picture loss evaluator 33 decodes the motion picture codes then records accurately decoded areas and estimates non-recorded areas as losses.

Problems that the Invention is to Solve

In case a service is provided where transmission of a motion picture code in the CIF format is switched to transmission of a motion picture code in the QCIF format in accordance with congestion of the transmission path and degradation of the transmission error rate, quality of the motion picture is roughly divided into two phases.

CIF and QCIR respectively have the CIF format comprising 352 pixels in the horizontal direction and 288 pixels in the vertical direction and QCIF format comprising 176 pixels in the horizontal direction and 144 pixels in the vertical direction. Thus there is a fourfold difference in motion picture information amount between CIF and QCIF.

When a motion picture loss of some percent occurs due to a transmission error, the difference in motion picture information amount between CIF and QCIF falls in the range of about 3.8 to 4.2 times.

Even in case charging is made in proportion to an accurately transmitted motion picture information amount, the number of pixels and frames, (that is, in which format the motion picture was transmitted) greatly affects the accurate motion picture information amount. A motion picture loss of some percent affects the accurately transmitted information amount only as much as one tenth of the difference in the format, as mentioned earlier.

In a related art motion picture code evaluator, a motion picture loss is determined on a pixel basis so that a received motion picture code is decoded.

In this case, the loss amount is calculated to a definition of 0.002% even in case one frame comprises 50,000 pixels.

Pixel-based motion picture loss does not greatly affect the motion picture information amount. Thus a definition of several percent will suffice as mentioned earlier. Nonetheless, in practice, all pixels are decoded to determine any loss, which process is an excessive burden on a receiver.

Under the current situation where transmission technology is fast-evolving, transmission capacity is increasing with the motion picture code rate ever expanding, it is critical to reduce the processing load especially on a receiver.

The object of the invention is to provide a motion picture code evaluator for evaluating the receiving state of a motion picture code with a smaller processing load without decoding the motion picture code, by determining presence/absence of an error in a frame header of the motion picture code and extracting a motion picture coding parameter contained in the frame header.

Means for Solving the Problems

In order to solve the problems, the invention provides, in a first aspect, a motion picture code evaluator for evaluating, on a motion picture receiver for receiving a motion picture code via transmission means and decoding the received motion picture code, the transmitted motion picture information amount which is based on losses of a motion picture caused by the transmission means, the motion picture code evaluator comprising means for testing the frame header of the motion picture code and determining the presence/absence of an error in the frame header to calculate the frame loss ratio per predetermined time, means for extracting a motion picture coding parameter contained in the frame header and detecting a variation in the motion picture coding parameter in the predetermined time, and means for summing the motion picture coding parameter and the motion picture coding parameter weighted by the variation in motion picture coding parameter in the predetermined time to calculate an ideal motion picture information amount in a predetermined time, characterized in that the motion picture code evaluator thereby obtains an actual motion picture information amount by multiplying the ideal motion picture information amount by (1-frame loss ratio).

In a second aspect of the invention, the motion picture coding parameter includes the number of motion picture code pixels, frame rate and number of quantization levels, and the means for detecting a variation in the motion picture coding parameter in the predetermined time detects the ratio of frames where the values of the number of pixels, frame rate and number of quantization levels remain the same, to the predetermined time.

In a third aspect of the invention, the values of the number of pixels, frame rate and number of quantization levels contained in the frame header where an error is detected are neglected and the values of the number of pixels, frame rate and number of quantization levels in the immediately preceding header are assumed as valid.

In a fourth aspect of the invention, the number of quantization levels in the header of the layers lower than the frame in addition to the number of quantization levels contained in the frame header is extracted as the number of quantization levels.

In a fifth aspect of the invention, the means for detecting a variation in the motion picture coding parameter in the predetermined time is a timer or a counter reset when a parameter different from one contained in the immediately preceding frame header is detected.

The invention, in a sixth aspect, provides a motion picture code transmission network which outputs a frame loss ratio according to any one of the first through fifth aspects to network management apparatus for managing transmission of a motion picture code to modify, at the sending party, at least one of the parameters including the screen size of a motion picture code, color difference format, frame rate and number of quantization levels.

The invention, in a seventh aspect, provides a billing system for a motion picture transmission service which charges depending on the receiving quality of a motion picture by outputting the actual motion picture information amount according to anyone of the first through fifth aspects to billing means.

Mode for Carrying Out the Invention

Figure 1:
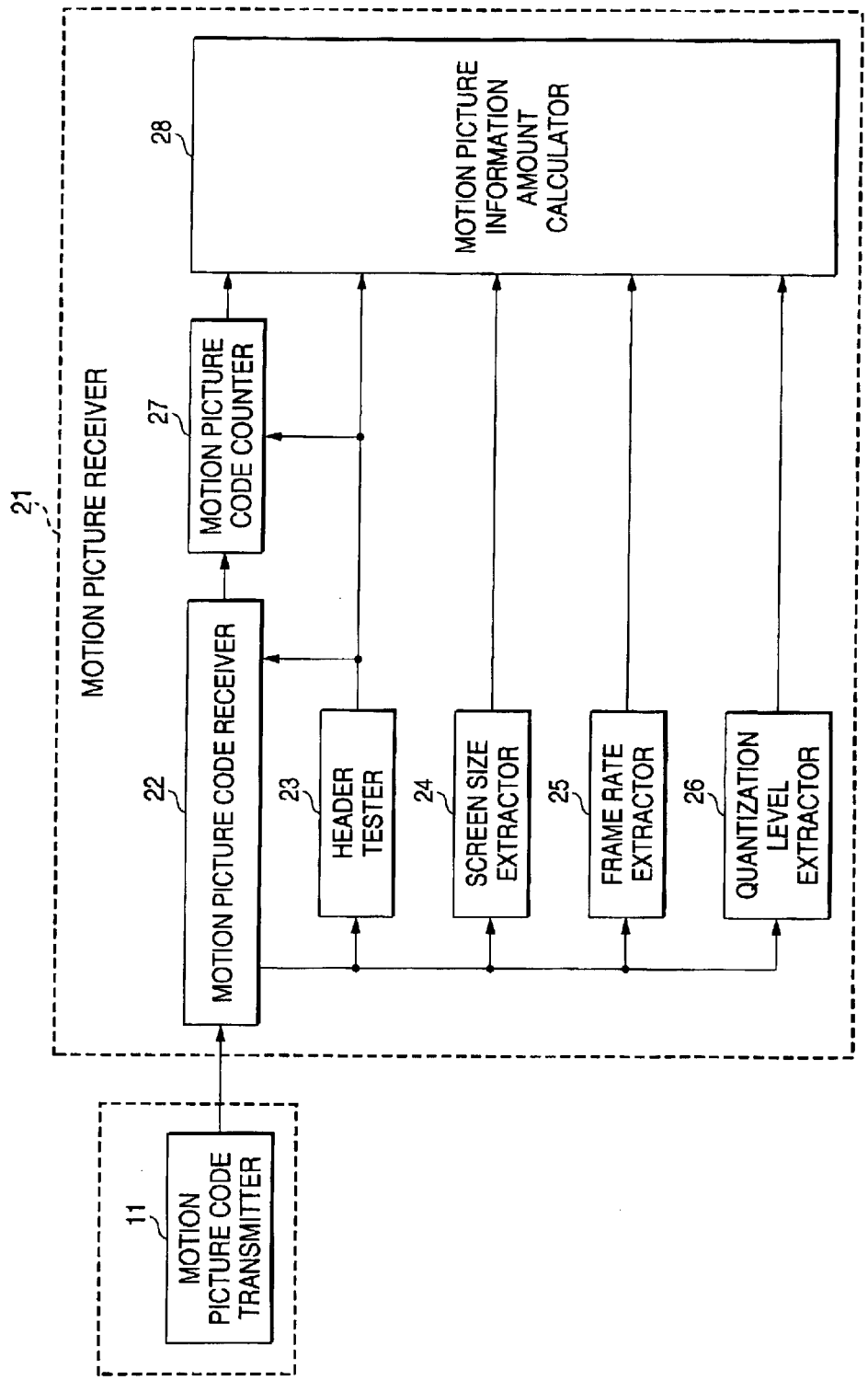
FIG. 1 is a block diagram showing the configuration of a motion picture code evaluator according to an embodiment of the invention.
Figure 2:
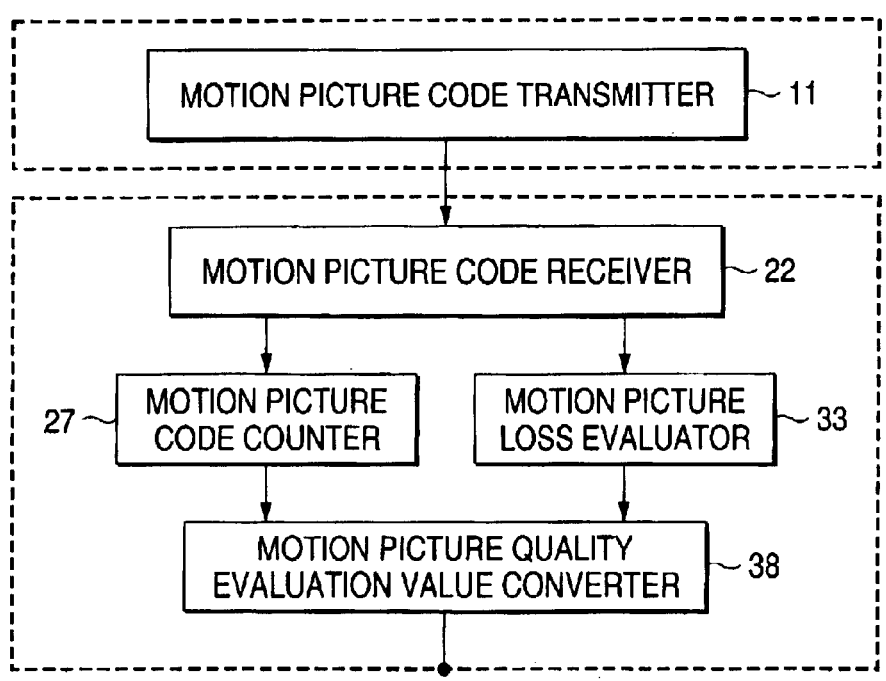
FIG. 2 is a block diagram showing the configuration of a motion picture code evaluator according to the related art.

In the motion picture code to which this invention is applied, the target of description is arranged in a hierarchy. In international standards such as MPEG-2, MPEG-4, H.261 and H.263, although some difference exists between respective standards, the hierarchy is configured for example as follows: from the bottom layer, a pixel, an 8-pixel by 8-pixel block, a 2 block by 2 block, a slice as successive macro blocks, a frame, GOP as a plurality of frames, and a sequence as a single stream to represent one screen with sequential frames.

The invention is not limited to the aforementioned international standards but is applicable to a motion picture code containing the screen size of the motion picture code, color difference format, frame rate, and quantization level.

An embodiment of the invention will be described referring to the drawings.

FIG. 1 is a block diagram showing the configuration of a motion picture code evaluator according to an embodiment of the invention.

In FIG. 1, a motion picture code transmitter 11 located at the sending party transmits a motion picture code.

A motion picture receiver 21 shown by dotted lines in FIG. 1 is located at the receiving party and transmits a motion picture code. A motion picture code receiver 22 located at the receiving party receives a motion picture code.

The motion picture receiver 21 at the receiving party comprises the motion picture code receiver 22, a header tester 23, a screen size extractor 24, a frame rate extractor 25, a quantization level extractor 26, a motion picture code counter 27, and a motion picture information amount calculator 28.

The a motion picture code counter 27 which is included in related apparatus also, counts the amount of a motion picture code to calculate the motion picture loss amount.

The header of the motion picture code received by the motion picture code receiver 22 is supplied to the header tester 23, the screen size extractor 24, the frame rate extractor 25, and the quantization level extractor 26.

The header tester 23 tests an input header for an error.

An error detected in the header test may be a CRC check error, header length error or a value exceeding a predetermined range.

In case the header length is improper or a value in an improper range is obtained, the layer section the header belongs to is determined as a loss.

In case the header is a frame header, the entire frame is assumed as a loss.

In case a display time code contained in a header is found delayed from the input time based on the comparison result, the layer the header belongs to is determined as a loss.

The header tester 23 outputs a frame header input signal to the motion picture information amount calculator 28 each time a frame header is input. In case the input frame header has an error, the header tester 23 outputs a frame header error signal to the motion picture information amount calculator 28.

By counting the frame header input signal and the frame header error signal for a predetermined time, the frame loss ratio per predetermined time is calculated on the motion picture information amount calculator 28.

The screen size extractor 24 reads the screen size and color difference format of the motion picture from an input header and calculates the number of pixels in the frame and outputs the number of pixels calculated to the motion picture information amount calculator 28.

The screen size extractor 24 comprises a screen size extractor timer (not shown) for measuring the time from when a screen size and a color difference format are read from an input header to when a different screen size and a different color difference format are read from a subsequent header different from the first header.

The screen size extractor 24 outputs to the motion picture information amount calculator 28 the measurement time to when a different screen size and a different color difference format are read from a subsequent header different from the first header as well as resets the screen size extractor timer and starts measuring the time to when a different screen size and a different color difference format are read from another subsequent header.

While the screen size extractor 24 comprising a screen size extractor timer (not shown) measures the time from when a screen size and a color difference format are read from an input header to when a different screen size and a different color difference format are read from a subsequent header different from the first header in the foregoing description, a screen size extractor counter may be provided instead of a screen size extractor timer to count the number of headers from when a screen size and a color difference format are read from an input header to when a different screen size and a different color difference format are read from a subsequent header different from the first header.

A merit of using a screen size extractor counter is that it is possible to accurately measure the number of headers where the values of the screen size and color difference format contained in the headers (frames) received remain the same, in case a motion picture code is not received in real time but received discontinuously with respect to the real time like in burst transmission.

In case the screen size extractor 24 comprising a screen size extractor timer (screen size extractor counter) (not shown) measures the time (number of headers) from when a screen size and a color difference format are read from an input header to when a different screen size and a different color difference format are read from a subsequent header different from the first header, the screen size and color difference format extracted from a header determined as abnormal are neglected and the screen size and color difference format in the immediately preceding header are assumed as valid in the header tester 23.

The frame rate extractor 25 reads the frame rate of a motion picture from an input header and outputs the frame rate thus read to the motion picture information amount calculator 28.

The frame rate extractor 25 comprises a frame size extractor timer (not shown) for measuring the time from when a frame rate is read from an input header to when a different frame rate is read from a subsequent header different from the first header.

The frame rate extractor 25 outputs to the motion picture information amount calculator 28 the measurement time to when a different frame rate is read from a subsequent header different from the first header as well as resets the frame rate extractor timer and starts measuring the time to when a different frame rate is read from another subsequent header.

While the frame rate extractor 25 comprising a frame rate extractor timer (not shown) measures the time from when a frame rate is read from an input header to when a different frame rate is read from a subsequent header different from the first header in the foregoing description, a frame rate extractor counter may be provided instead of a frame rate extractor timer to count the number of headers from when a frame rate is read from an input header to when a different frame rate is read from a subsequent header different from the first header.

A merit of using a frame rate extractor counter is that it is possible to accurately measure the number of headers where the value of the frame rate contained in the headers (frames) received remains the same, in case a motion picture code is not received in real time but received discontinuously with respect to the real time like in burst transmission.

In case the frame rate extractor 25 comprising a frame rate extractor timer (frame rate extractor counter) (not shown) measures the time (number of headers) from when a frame rate is read from an input header to when a different frame rate is read from a subsequent header different from the first header, the frame rate extracted from a header determined as abnormal is neglected and the frame rate in the immediately preceding header is assumed as valid in the header tester 23.

The quantization level extractor 26 reads the number of quantization levels of a motion picture from an input header and outputs the number of quantization levels thus read to the motion picture information amount calculator 28.

The quantization level extractor 26 comprises a quantization level extractor timer (not shown) for measuring the time from when a number of quantization levels is read from an input header to when a different number of quantization levels is read from a subsequent header different from the first header.

The quantization level extractor 26 outputs to the motion picture information amount calculator 28 the measurement time to when a different number of quantization levels is read from a subsequent header different from the first header as well as resets the quantization level extractor timer and starts measuring the time to when a different number of quantization levels is read from another subsequent header.

While the quantization level extractor 26 comprising a quantization level extractor timer (not shown) measures the time from when a number of quantization levels is read from an input header to when a different number of quantization levels is read from a subsequent header different from the first header in the foregoing description, a quantization level extractor counter may be provided instead of a quantization level extractor timer to count the number of headers from when a number of quantization levels is read from an input header to when a different number of quantization levels is read from a subsequent header different from the first header.

A merit of using a quantization level extractor counter is that it is possible to accurately measure the number of headers where the value of the number of the quantization levels contained in the headers (frames) received remains the same, in case a motion picture code is not received in real time but received discontinuously with respect to the real time like in burst transmission.

In case the quantization level extractor 26 comprising a quantization level extractor timer (quantization level extractor counter) (not shown) measures the time (number of headers) from when a number of quantization levels is read from an input header to when a different number of quantization levels is read from a subsequent header different from the first header, the number of quantization levels extracted from a header determined as abnormal is neglected and the number of quantization levels in the immediately preceding header is assumed as valid in the header tester 23.

A parameter concerning the quantization level (number of quantization levels) is not set in the frame header section only for example in MPEG-4 but can be further changed in a header of a layer lower than the frame within the range of the number of quantization levels set in the frame header. That is, the quantization level can be changed within the same frame. In case the data can be extracted, more accurate extraction of the number of gray-scale quantization levels is made possible.

As mentioned in the Problems that the Invention is to Solve section, evaluation of a motion picture code needs only necessary accuracy so that extraction from higher layers will reduce the processing load.

Next, the processing in the motion picture information amount calculator 28 will be described.

The motion picture information amount calculator 28 counts inputs of a frame header input signal and a frame header error signal from the header tester 23 and calculates the frame loss ratio per determined time T.

The motion picture information amount calculator 28, assuming that there are no frame losses, calculates an ideal motion picture information amount from the number of pixels, frame rate and number of quantization levels input from the screen size extractor 24, the frame rate extractor 25, and the quantization level extractor 26.

In case a measurement time (count number) is input from one of the counters (timers) provided in the screen size extractor 24, the frame rate extractor 25, and the quantization level extractor 26, the motion picture information amount calculator 28 assigns weights in proportion to the measurement time (count number) and sums up the weighted values to calculate an ideal motion picture information amount.

Here, in particular, the timer may use a measurement time converted to a time which is based on an ideal time to be displayed after reading the display time code read from the frame header.

The real time to be displayed according to the display time code can be converted in almost all motion picture code forms.

For example, while the display time code increments in units of 0.1 seconds in terms of a real time, in case an increment of the display time code of the frame header is 3 when the motion picture coding parameter value read anew has been modified, the duration is calculated as 0.3 seconds.

As mentioned earlier, as long as the frame rate is constant in burst data reception, it is simpler to use the aforementioned counter. In case the frame rate is not constant, it is more accurate to calculate the real duration from the time obtained by converting the timer value by using the display time code.

Which method to use may be determined considering the required accuracy of the motion picture information amount and the implementation cost.

Assume that the number of pixels has changed in a predetermined time T and the number of pixels is P1, frame rate is F1 and quantization level is Q1 in the measurement time t1 while the number of pixels is P2, frame rate is F1 and quantization level is Q1 in the residual time t2 (predetermined time T-measurement time t1).

The ideal motion picture information amount I2 of the former (measurement time t1) is calculated while weighted by the measurement time t1. The ideal motion picture information amount I1 of the latter (residual time t2) is calculated while weighted by the measurement time t2. I1 and I2 are then added up and the ideal motion picture information amount I in the predetermined time T is calculated.

Next, the motion picture information amount calculator 28 multiplies the ideal motion picture information amount in the predetermined time T by a frame loss ratio to calculate an actual motion picture information amount.

The motion picture information amount calculator 28 may output the actual motion picture information amount calculated in the processing as an evaluation result of the motion picture code.

The actual motion picture information amount may be calculated as follows:

In the motion picture information amount calculator 28, the number of outputs of a frame header input signal and a frame header error signal is counted and the sum of both count values is calculated and assumed as an actual number of frames.

In the motion picture information amount calculator 28, the value obtained by multiplying the frame rate value by a predetermined time or ideal number of frames assuming no losses from the time a frame rate value different from the frame rate value read in the frame rate detector 23 is read for the first time. The increased number of the actual frames in the same predetermined time is calculated. The difference between the ideal number of frames and the increased number of actual frames is assumed as a number of non-received frames.

In case the increased number of actual frames is smaller than the ideal number of frames, the frame header itself is not yet received. Thus, the frame loss ratio in the predetermined time is a value obtained by dividing the sum of the count value of the frame error signal and the number of non-received frames by the number of ideal frames.

In the motion picture information amount calculator 28, the number of ideal motion picture amount is multiplied by (1-frame loss ratio) to obtain the actual motion picture information amount.

The motion picture information amount calculator 28 may output the frame loss ratio.

In case the frame rate is not specified in the code, the following method may be used to calculate the actual motion picture information amount.

In the motion picture information amount information calculator 28, the motion information amount of a frame for which the header detector 23 has output a frame header error signal may be assume as zero to prevent addition.

In this case, the ideal motion picture information amount equals the actual motion picture information amount, since the frame loss has been corrected.

Or, in the motion picture information amount information calculator 28, the time from when the header detector 23 outputs a frame header signal to the header detector 23 outputs a frame heard input signal next is calculated to obtain a loss time. The ideal motion picture information amount may be calculated by using, as a weight, the actual duration obtained by subtracting the loss time from the duration up to when the motion picture coding parameter is modified.

In this case also, the ideal motion picture amount equals the actual motion picture information amount, since the frame loss has been corrected.

Which method to use may be determined considering the required accuracy of the motion picture information amount and the implementation cost.

The motion picture information amount information calculator 28 may output an evaluation result to billing apparatus (not shown).

The billing apparatus determines the amount charged to the user of a motion picture transmission service based on the input actual motion picture information amount.

The motion picture information amount information calculator 28 may calculate the actual motion picture code amount per predetermined time T by multiplying the code amount input from the motion picture code counter 27 by the frame loss ratio and output the amount of the calculated actual motion picture code.

The motion picture information amount information calculator 28 may output the frame loss ratio to external network management apparatus (not shown) for managing transmission of a motion picture code.

The network management apparatus can modify the motion picture coding parameters (screen size, color difference format, frame rate and number of quantization levels) of the motion picture coding apparatus (not shown) arranged before the motion picture code transmitter 11.

This makes it possible to choose motion picture coding parameters depending on the network situation thus further assuring transmission of motion picture information.

In case the frame rate varies among the motion picture coding parameters (screen size, color difference format, frame rate and number of quantization levels), weight of a single frame loss varies. Thus, a time corresponding to a lost frame, not the loss ratio of the number of lost frames, is assigned a weight to evaluate the loss amount, thereby performing more accurate evaluation of a motion picture code.

By using this evaluation in a network management system for performing a motion picture transmission service, it is possible to fix a motion picture service fee satisfying the request of the user.

The motion picture code counter 27 may be done without in the embodiment of FIG. 1. In such a case, the motion picture information amount information calculator 28 cannot calculate the actual code amount.

Advantage of the Invention

The invention provides, in a first aspect, a motion picture code evaluator for evaluating, on a motion picture receiver for receiving a motion picture code via transmission means and decoding the received motion picture code, the transmitted motion picture information amount which is based on losses of a motion picture caused by the transmission means, the motion picture code evaluator comprising means for testing the frame header of the motion picture code and determining the presence/absence of an error in the frame header to calculate the frame loss ratio per predetermined time, means for extracting a motion picture coding parameter contained in the frame header and detecting a variation in the motion picture coding parameter in the predetermined time, and means for summing the motion picture coding parameter and the motion picture coding parameter weighted by the variation in motion picture coding parameter in the predetermined time to calculate an ideal motion picture information amount in a predetermined time, characterized in that the motion picture code evaluator thereby obtains an actual motion picture information amount by multiplying the ideal motion picture information amount by (1-frame loss ratio). Thus it is possible to evaluate the receiving state of a motion picture code with a smaller processing load without decoding the motion picture code, by determining presence/absence of an error in a frame header of the motion picture code and extracting a motion picture coding parameter contained in the frame header.

In a second aspect of the invention, the motion picture coding parameter includes the number of motion picture code pixels, frame rate and number of quantization levels, and the means for detecting a variation in the motion picture coding parameter in the predetermined time detects the ratio of frames where the values of the number of pixels, frame rate and number of quantization levels remain the same, to the predetermined time. Thus it is possible to perform more accurate evaluation even in case a motion picture coding parameter has been modified.

In a third aspect of the invention, the values of the number of pixels, frame rate and number of quantization levels contained in the frame header where an error is detected are neglected and the values of the number of pixels, frame rate and number of quantization levels in the immediately preceding header are assumed as valid. It is thus possible to reduce the influence of an error in the number of pixels, frame rate and number of quantization levels as motion picture coding parameters contained in a frame header where an error is detected.

In a fourth aspect of the invention, the number of quantization levels in the header of the layers lower than the frame in addition to the number of quantization levels contained in the frame header is extracted as the number of quantization levels. Thus it is possible to obtain a more detailed number of quantization levels thereby allowing more accurate evaluation.

In a fifth aspect of the invention, the means for detecting a variation in the motion picture coding parameter in the predetermined time is a timer or a counter reset when a parameter different from one contained in the immediately preceding frame header is detected. Thus it is possible to configure a system by using low-cost parts available on the market.

The invention, in a sixth aspect, provides a motion picture code transmission network which outputs a frame loss ratio according to any one of the first through fifth aspects to network management apparatus for managing transmission of a motion picture code to modify, at the sending party, at least one of the parameters including the screen size of a motion picture code, color difference format, frame rate and number of quantization levels. This makes it possible to choose motion picture coding parameters depending on the network situation thus further assuring transmission of motion picture information.

The invention, in a seventh aspect, provides a billing system for a motion picture transmission service which charges depending on the receiving quality of a motion picture by outputting the actual motion picture information amount according to anyone of the first through fifth aspects to billing means. This allows proper billing depending on the receiving quality of the motion picture code at the receiving party.

What is claimed is:

1. A motion picture code evaluator for evaluating, on a motion picture receiver for receiving a motion picture code via transmission means and decoding the received motion picture code, the transmitted motion picture information amount which is based on losses of a motion picture caused by said transmission means, said motion picture code evaluator comprising:

means for testing a frame header of said motion picture code, the motion picture code comprising a screen size of the motion picture code, a color difference format, a frame rate and a quantization level, and determining the presence/absence of an error in the frame header to calculate the frame loss ratio per predetermined time, means for extracting motion picture coding parameter contained in said frame header and detecting a variation in said motion picture coding parameter in said predetermined time, and means for summing said motion picture coding parameter and the motion picture coding parameter weighted by said variation in the motion picture coding parameter in said predetermined time to calculate an ideal motion picture information amount in a predetermined time, wherein said motion picture code evaluator thereby obtains an actual motion picture information amount by multiplying the ideal motion picture information amount by (1-frame loss ratio).

2. A motion picture code evaluator according to claim 1 wherein said motion picture coding parameter includes the number of motion picture code pixels, frame rate and number of quantization levels, and the means for detecting a variation in said motion picture coding parameter in said predetermined time detects the ratio of frames where the values of said number of pixels, frame rate and number of quantization levels remain the same, to said predetermined time.

3. A motion picture code evaluator according to claim 2 wherein the values of said number of pixels, frame rate and number of quantization levels contained in said frame header where an error is detected are neglected and that the values of the number of pixels, frame rate and number of quantization levels in the immediately preceding header are assumed as valid.

4. A motion picture code evaluator according to claim 2 or 3 wherein the number of quantization levels in the header of the layers lower than the frame in addition to the number of quantization levels contained in said frame header is extracted as said number of quantization levels.

5. A motion picture code evaluator according to any one of claims 1–3 wherein the means for detecting a variation in the motion picture coding parameter in said predetermined time comprises a timer or a counter reset when a parameter different from one contained in the immediately preceding frame header is detected.

6. A motion picture code transmission network which outputs a frame loss ratio according to any one of claims 1–3 to network management apparatus for managing transmission of a motion picture code to modify, based on the frame loss ratio at the sending party, at least one of the parameters including the screen size of a motion picture code, color difference format, frame rate and number of quantization levels.

7. A billing system for a motion picture transmission service wherein said system charges depending on the receiving quality of a motion picture by outputting the actual motion picture information amount according to any one of claim 1 through 3 to billing means.

8. A motion picture code evaluator according to claim 4 wherein the means for detecting a variation in the motion picture coding parameter in said predetermined time is a timer or a counter reset when a parameter different from one contained in the immediately preceding frame header is detected.

9. A motion picture code transmission network which outputs a frame loss ratio according to claim 4 to network management apparatus for managing transmission of a motion picture code to modify, based on the frame loss ratio at the sending party, at least one of the parameters including the screen size of a motion picture code, color difference format, frame rate and number of quantization levels.

10. A billing system for a motion picture transmission service wherein said system charges depending on the receiving quality of a motion picture by outputting the actual motion picture information amount according to claim 4 to billing means.

* * * * *